United States Patent [19]

Paton et al.

[11] Patent Number: 4,885,450

[45] Date of Patent: Dec. 5, 1989

[54] MACHINE FOR RESISTANCE BUTT WELDING OF PIPES

[76] Inventors: Boris E. Paton, ulitsa Chkalova, 41A, kv.26.; Vladimir K. Lebedev, ulitsa Engelsa, 25, kv.12.; Sergei I. Kuchuk-Yatsenko, prospekt 40-letia Oktyabrya, 21, kv.93.; Vasily A. Sakharnov, ulitsa Solomenskava, 41, kv.93.; Alexandr K. Kharchenko, ulitsa Demeevskaya, 37, kv. 165.; Mikhail R. Unigovsky, ulitsa Pushkinskaya, 21, kv.33, all of, Kiev, U.S.S.R.

[21] Appl. No.: 286,345

[22] Filed: Dec. 16, 1988

[51] Int. Cl.⁴ .............................................. B23K 11/02
[52] U.S. Cl. ....................................... 219/101; 219/67
[58] Field of Search .............. 219/101, 102, 104, 59.1, 219/67

[56] References Cited

U.S. PATENT DOCUMENTS 2,974,217 3/1961 Crawford ............................ 219/101
3,732,391 5/1973 La Force et al. ..................... 219/67

FOREIGN PATENT DOCUMENTS 351423 of 1970 U.S.S.R. .
251719 of 1984 U.S.S.R. .

Primary Examiner—Clifford C. Shaw
Attorney, Agent, or Firm—Lilling & Greenspan

[57] ABSTRACT

The machine of the invention, intended for resistance butt welding of pipes, comprises two semi-housings mounted externally on the pipes to be welded to the opposite sides of a joint and interconnected by the flash and upset drive, a clamping device mounted in each semihousing, including radially arranged hydraulic cylinders with clamping shoes, and a control system of the hydraulic cylinders.

The control system of the hydraulic cylinders includes control valve units structurally associated with the piston rods of the hydraulic cylinders. The control valve units include follow-up spool valves interconnected by their common actuator linkage.

3 Claims, 5 Drawing Sheets

MACHINE FOR RESISTANCE BUTT WELDING OF PIPES

FIELD OF THE INVENTION

The invention relates to equipment operable for resistance butt welding of pipes, particularly of pipes of small-to-medium diameters (to 550 mm), and more specifically it relates to machines for resistance butt welding of pipes adapted to be externally accommodated on the pipes to be welded. The invention can be employed in construction of oil and gas trunk lines in the oil and gas production and distribution industry.

DESCRIPTION OF THE PRIOR ART

The quality of a weld produced by resistance butt welding is significantly dependent on the reliability of the clamping of the pipes being welded and the accuracy of their relative centering. A known machine for resistance butt welding of pipes (SU, A, No. 251719) comprises clamping devices for clamping and centering the pipes being welded, mounted in the respective semihousings of the machine, accommodated on the pipes being welded to the opposite sides of the joint and operatively connected with a flash and upset drive.

Each clamping device includes clamping dies or shoes uniformly spaced about the periphery of the pipe in two half-rings enclosing the pipe from two sides for moving in opposition in a circular path under the effort of a hydraulic cylinder, the half-rings being operatively connected to the housing of the hydraulic cylinder through pivoted rods. The operative connection between the half-rings and shoes is effected through cam rollers press-fitted into the half-rings and abutting against the slanting rear surfaces of the respective shoes.

When the half-rings are circularly moved in opposition, in synchronism maintained by a synchronizing device in guarantee the accuracy of the central position of the hydraulic cylinder in its motion, the cam rollers engaging the slanting surfaces of the shoes drivingly and uniformly move the latter towards the centre for clamping and centering the pipes.

A disadvantage of this known arrangement is the high energy losses incurred by the friction in the engagement of the cam rollers with the slanting surfaces of the shoes and in the motion of the half-rings within the respective semihousings.

To compensate for these energy losses incurred by friction, the hydraulic cylinders should ensure sufficiently great clamping efforts, which requirement inevitably leads to increased dimensions of the hydraulic cylinders and, hence, to greater dimensions and weight of the entire unit.

Moreover, with the hydraulic cylinder supplying the clamping effort being in the known machine relatively greatly spaced from the zone of the application of this effort, the design of the clamping device is complicated by the incorporation of additional retention mechanisms and a bulky locking assembly.

In another known machine for resistance butt welding of pipes (SU, A, No. 351423) the clamping and sentering of the pipes being welded are performed separately, by two different mechanisms of the clamping device, i.e. by the centering mechanism and the clamping mechanism accommodated, respectively, internally and externally of the pipes being welded.

The centering mechanism includes centering shoes mounted on a central carrier bar insertable in the pipes and operatively connected with a radial displacement actuator, and also centering rollers connected through a leverage and a holder with an axial displacement actuator.

The clamping mechanism accommodated externally of the pipes including clamping dies or shoes mounted on the end faces of the housings or radially arranged hydraulic cylinders whose respective piston rods are fast with the respective semihousing of the machine. The clamping shoes are intended to apply the clamping effort to the external surface of the respective pipe.

The hydraulic cylinders of the internal openings mechanisms and external clamping mechanisms have a common control system.

Compared with the abovedescribed design, the last-described machine involves less energy losses incurred by friction, which provides for having smaller hydraulic cylinders. The separation of the clamping and centering functions simplifies the structure of the two mechanisms performing these respective functions, which, in addition to the smaller dimensions of the hydraulic cylinders, provides for reducing the overall dimensions of the machine. The design ensures high reliability of the clamping and adequate accuracy of the relative centering of thin-wall pipes of relatively great diameter; however, the design is not suitable for pipes of small-to-medium diameters (to 550 mm) on account of the impossibility of accommodating the insertable part of the clamping device in the internal space of such pipes.

Furthermore, the total weight of the entire machine is relatively great, which involves the necessity of having higher load capacities of the pipe-laying units or other handling means operated for setting the machine to its working position.

Moreover, with the machine having the insertable (internal) and external parts of the clamping device, the procedure of positioning the machine at a joint is both prolonged and complicated, adversely affecting the overall efficiency of the pipeline construction technology.

SUMMARY OF THE INVENTION

It is an object of the present invention to create a compact machine for resistance butt welding of pipes, having a relatively small weight.

It is another object of the present invention to reduce the input of time into auxiliary operations.

In particular, it is an object of the present invention to create a machine for resistance butt welding of pipes with an optimized arrangement of the components of the control valve units of the control system of the hydraulic cylinders and with introduction of new connections of these components.

It is a further object of the present invention to create a machine for resistance butt welding of pipes, wherein the clamping device should provide not only for clamping the pipes, but also for centering the pipes to be welded by applying the effort to their external surfaces.

These and other objects are attained in a machine for resistance butt welding of pipes, comprising two semihousings adapted to be mounted externally on the pipes to be welded to both sides of a joint, a flash and upset drive operatively connected to said semihousings, a clamping device mounted in each one of said semihousings, including radially arranged hydraulic cylinders having their piston rods rigidly connected with the respective semihousing, provided with shoes adapted to apply a clamping effort to the external surface of the respective pipe, and a system for controlling these hydraulic cylinders which, in accordance with the invention, includes control valve units with follow-up spool valves structurally associated with the piston rods of the respective hydraulic cylinders, and a common actuator of displacement of the follow-up spool valves.

The provision of the common actuator of the follow-up spool valves of each clamping device allows to synchronize the motion of the hydraulic cylinders with the clamping shoes with respect of each semihousing, which, in its turn, provides for employing these shoes not only for clamping the pipes to be welded, but also for their relative centering in the operatively interconnected semihousings of the machine. This eliminates the necessity of centering the pipes to be welded from inside, thus enabling to do without a centering mechanism of the type described above, and in this way to reduce the overall weight of the machine and the input of time into the procedure of setting it in the working position. Furthermore, this allows to operate the machine for resistance butt welding of pipes of small-to-medium diameters whose internal space would not accommodate an insertable centering mechanism. The reduction of the weight brought about by smaller overall dimensions of the machine is further promoted by the control units being structurally associated with the piston rods of the hydraulic cylinders.

To reduce the overall dimensions of the machine, it is further expedient that the follow-up spool valves should be connected to one another and to their common actuator through a mechanical linkage including universal-joint shafts.

With this operative connection effected otherwise, e.g. with the aid of a central gear cooperating with pinions connected with the respective spool valves, it would have complicated the mechanical structure of the machine and increase its dimensions and weight.

The follow-up spool valve of each control valve unit should preferably include a valve member accommodated for axial displacement within the piston rod of the respective hydraulic cylinder and a lead screw and nut couple with the lead screw mounted for axial displacement relative to the piston rod of the respective hydraulic cylinder coaxially with the valve member which is resiliently urged against the end face of the lead screw, the nut of the lead screw and nut couple being rigidly connected with the housing of the hydraulic cylinder.

Other structural versions of the unit are possible, e.g. with a rack-and-pinion mechanism; it is essential, though, that either one of the components of the mechanism, e.g. the pinion, should be connected with the housing of the hydraulic cylinder, the other component, e.g. the rack, being connected with its piston rod.

BRIEF DESCRIPTION OF THE DRAWINGS

The invention will be further described in connection with its embodiment, with reference being made to the accompanying drawings, wherein.

DESCRIPTION OF THE PREFERRED EMBODIMENT

Figure 1:
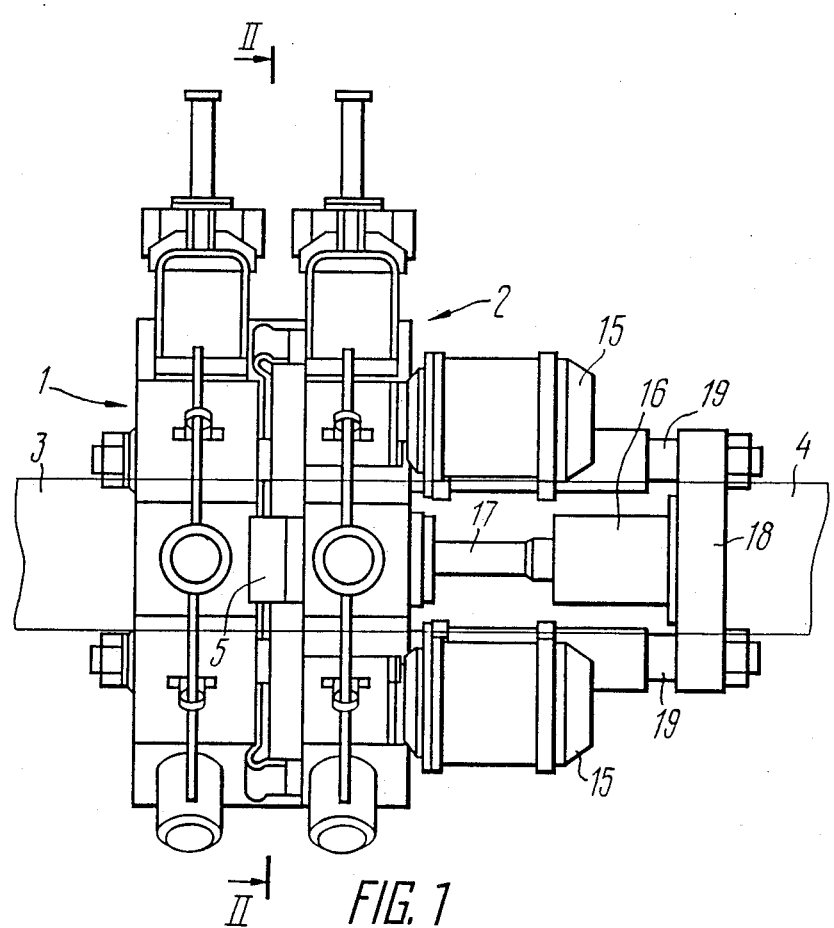
FIG. 1 is a general view of a machine for resistance butt welding of pipes, embodying the invention.
Figure 2:
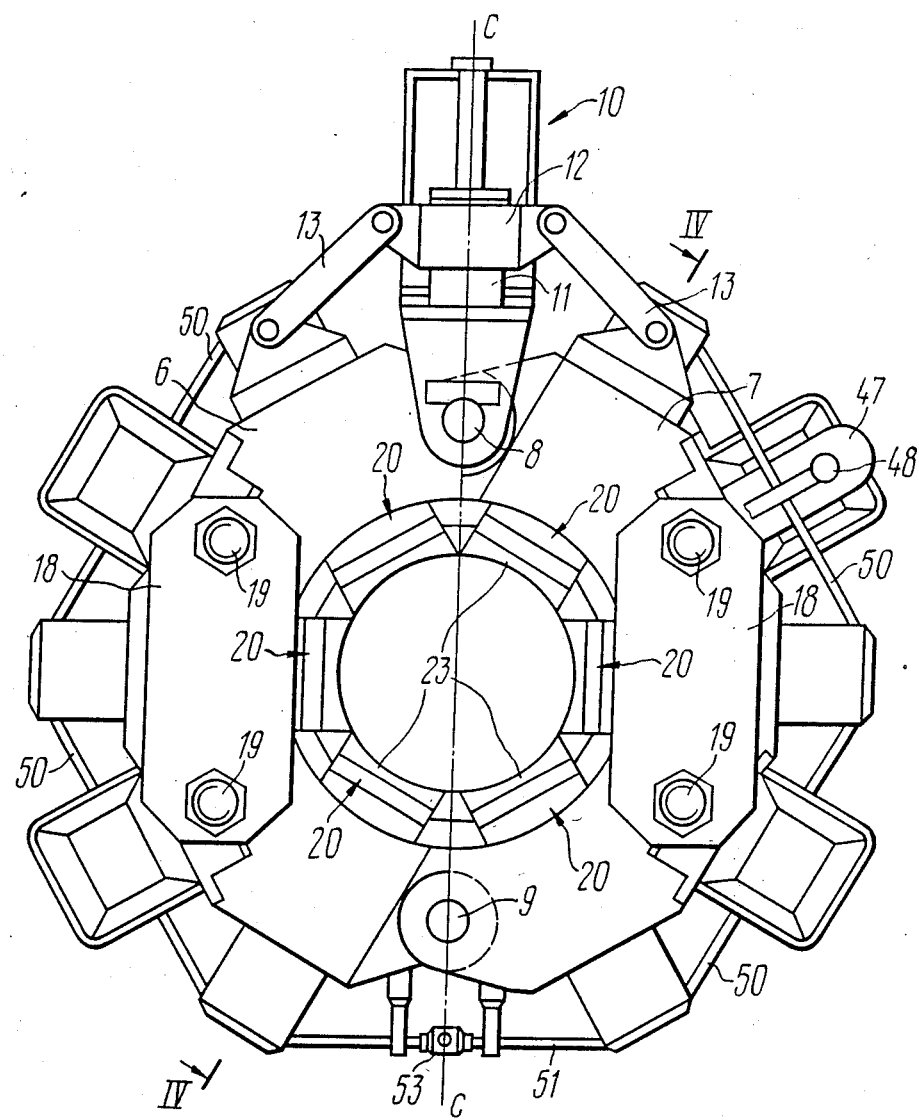
FIG. 2 is a sectional view taken on line II—II of FIG. 1.
Figure 3:
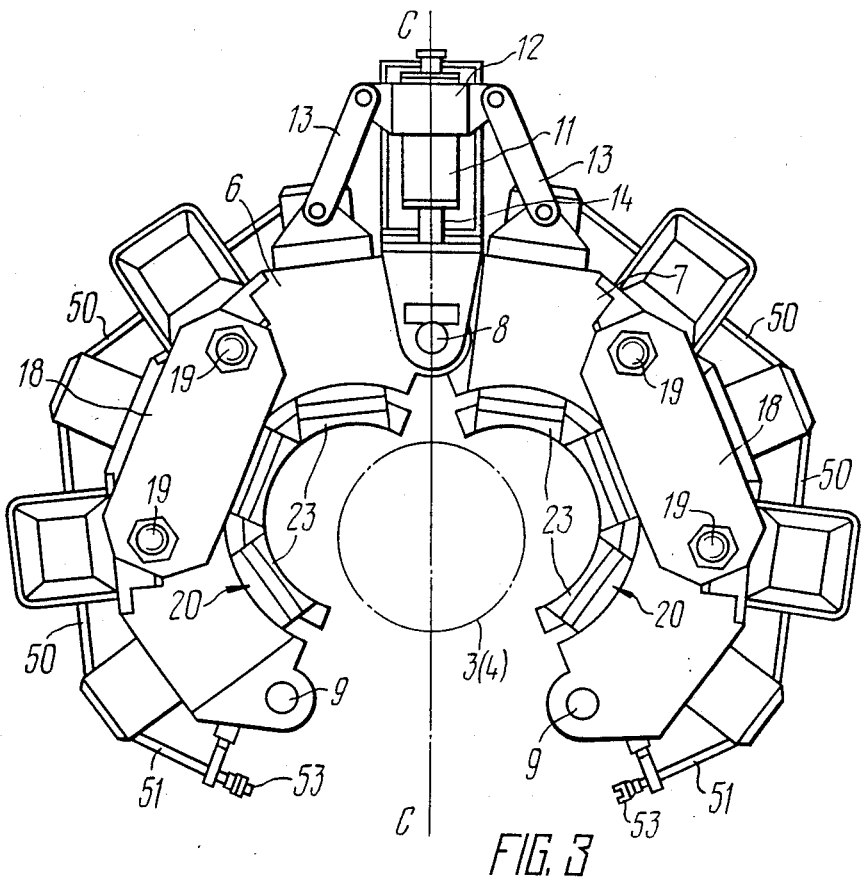
FIG. 3 is a view taken along arrow line A of FIG. 1 (with the semihousings open)

Referring now in particular to the appended drawings, a machine for resistance butt welding of pipes, embodying the invention, comprises two semihousings 1 and 2 (FIG. 1) adapted to be externally mounted on a pair of pipes 3 and 4 to be welded (showed conditionally with dash-and-dot lines), to both sides of a joint 5. Originally, the semihousings 1 and 2 are detachable along line C—C (FIGS. 2 and 3), each including two parts 6 and 7 enclosing the respective pipe 3 or 4 (FIG. 1) from the opposite sides, mounted for pivoting towards each other about a common pivot 8 (FIGS. 2 and 3). A lock 9 (FIG. 2) secures the two parts 6 and 7 of each respective semihousing 1 or 2 (FIG. 1) together in the closed position.

Correspondingly, each semihousing 1 or 2 is provided with a mechanism 10 (FIG. 2) for its openings, including a hydraulic cylinder 11 mounted in a holder 12 operatively connected with the parts 6 and 7 (FIG. 2) of the respective semihousing through pivoted rods 13, The piston rod 14 (FIG. 3) of the hydraulic cylinder 11 is rigidly connected to the pivot 8.

The semihousing 2 (FIG. 1) has mounted thereon welding transformers 15 and a flash and upset drive including two hydraulic cylinders 16 having their respective piston rods 17 rigidly secured to the semihousing 2. The hydraulic cylinders 16 fixedly extend through crosspieces 18 (FIGS. 1 to 3) carrying bars 19 rigidly connected with the semihousing 1 and extending through the corresponding openings (not shown) in the semihousing 2.

The semihousings 1 and 2 are provided with identical clamping devices including hydraulic cylinders 20 (FIGS. 2 and 3) whose respective geometrical axes in the closed position of the semihousings 1 and 2 (FIG. 1) extend radially with respect to the axis of the respective clamped pipe 3 or 4 and are preferably uniformly spaced angularly about these pipes 3 and 4.

The rods 21 (FIG. 4) of the respective hydraulic cylinders 20 are rigidly secured to the respective semihousing 1 or 2 (FIG. 1), the end of the detachable housing 22 (FIG. 4) of each hydraulic cylinder 20, opposite to the piston rod 21 projecting therefrom, carrying shoes 23 intended for clamping the respective pipe 3 or 4 (FIG. 1) by engaging its periphery, and for supplying to it the welding current from the respective welding transformer 15 to which the shoes 23 (FIGS. 2 to 4) are electrically connected through respective flexible power cables (not shown).

In accordance with the invention, the control system of the hydraulic cylinders 20 includes control valve units with follow-up spool valves 24 (FIG. 4) including each a spool valve member 25 mounted for axial reciprocation in the valve housing 26 press-fitted into the piston rod 21 of the respective hydraulic cylinder 20 made integral with its piston 27, and a lead screw and nut couple 28 with the lead screw 29.

For mounting the valve member 25 in its housing 26, the latter has made therein a blind cylindrical bore 30 with counterbores 31 and 32 of a larger diameter. The externally projecting end of the piston rod 21 carries a pressure connection 33 and a drain connection 34, the pressure connection 33 communicating with the bore 30 via a pressure passage 35 made in the piston rod 21 and in the valve housing 26, the outlet 36 of the passage 35 communicating with the bore 30 intermediate the two counterbores 31 and 32.

The drain connection 34 communicates with the bore 30 via a drain passage 37 whose inlets 38 and 39 from the bore 30 are disposed to the opposite sides of the respective counterbores 31 and 32 relative to the outlet 36 of the pressure passage 35. Furthermore, there are made through the walls of the piston rod 21 and of the valve housing 26 a passage 40 communicating the bore 30 in the area of the counterbore 31 with the above-piston space D of the hydraulic cylinder 20 and a passage 41 communicating the bore 30 in the area of the counterbore 32 with the under-piston space E of the hydraulic cylinder 20. The passages 35, 37, 40 and 41 made through the walls of the piston rod 21 and of the valve housing 26 jointly with the other abovelisted components of the follow-up valve 24 form the control valve unit of each respective hydraulic cylinder 20.

The spool valve member 25 is cylindrical with larger-diameter shoulders 42, 43, 44, 45 and a narrow tail portion 46 beyond the extreme shoulder 45, facing the above-piston space D. The two central shoulders 43 are of a width either equal to or slightly in excess of the width of the counterbores 31 and 32, and are spaced by a distance equalling the spacing of these counterbores 31 and 32.

The respective pressure connections 33 of all the hydraulic cylinders 20 of the two clamping devices are connected to a pump (not shown), and their drain connections 34 are connected to a drain tank (not shown, ether).

The follow-up valves 24 of the respective hydraulic cylinders 20 of each clamping device are drivingly connected to a common actuator including an electric motor 47 with a worm-gear reducer 48, mounted on the respective semihousing 1 or 2 (FIG. 2).

Figure 4:
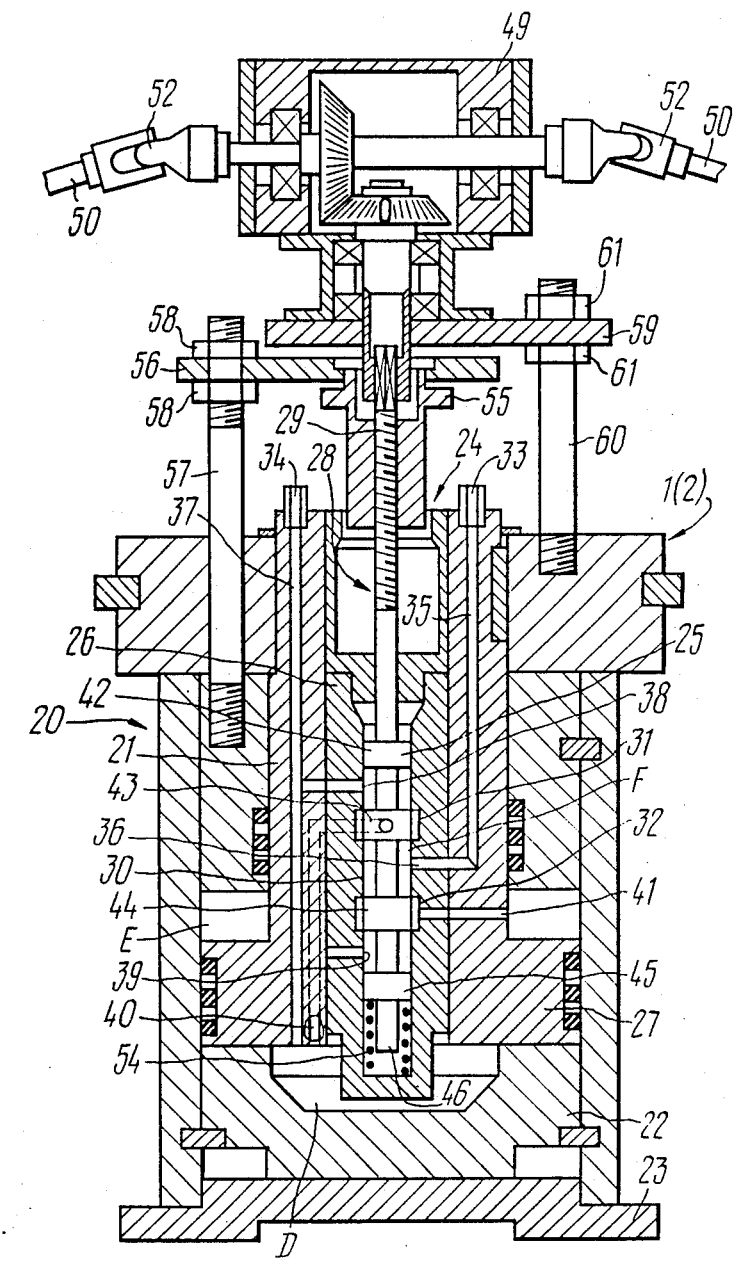
FIG. 4 shows on a larger scale a sectional view taken on line IV—IV of FIG. 2, with the follow-up spool valve in a neutral position.

The lead screws 29 of all the respective follow-up valves 24 of each clamping device are operatively interconnected and connected to their common actuator through respective bevel gearings 49 (FIG. 4) and universal-joint shafts 50 and 51 (FIGS. 2 and 3). The shafts 50 and 51 are connected to the input shafts of the respective bevel gearings 49 through universal joints 52 (FIG. 4). One of the universal-joint shafts 50 (FIGS. 2 and 3) carries the worm wheel of the worm-gear reducer 48, acting as the latter's output shaft; whereas the universal-joint shaft 51 in the opening area of the respective semihousing 1 or 2 is split into two parts connectable by a coupling 53 which can be any suitable known quick-release coupling. The lead screw 29 of each lead screw and nut couple 28 (FIG. 4) is mounted for axial reciprocation in a splined bore of the output shaft of the respective bevel gearing 49, coaxially with the valve member 25 urged against the end face of the lead screw 29 by a compression spring 54 received about the tail portion 46 and abutting against the bottom of the blind bore 30 of the valve housing 26.

The nut 55 of the lead screw and nut couple 28 is fast with the housing 22 of the hydraulic cylinder 20 with the aid of a strap 56 and two threaded pins 58, and the housing of each bevel gearing 49 is fast with the respective semihousing 1 or 2 through a strap 59 and threaded pins 60 with nuts 61.

The machine for resistance butt welding of pipes operates, as follows.

In its open state (FIG. 3), the machine is suspended from the boom of a pipe-laying machine (not shown) and positioned above the end portion of one of the pipes (3 or 4) to be welded, which is the extreme or endmost pipe in a string being constructed, with the semihousing 2 projecting beyond this endmost pipe, e.g. the pipe 3. Then the other pipe to be welded, e.g. the pipe 4, is provided and led to abut against the pipe 3, so that the semihousing 2 encloses the end portion of this pipe 4.

With the working fluid under pressure fed into the under-piston area of the hydraulic cylinder 11 of the semihousing 1, the hydraulic cylinder 11 is driven jointly with the holder 12 towards the pivot 8 (FIG. 3), pushing the rods 13 to turn the parts 6 and 7 of the semihousing 1, closing them on the pipe 3. The closed position of the semihousing 1 (FIG. 2) is retained with the lock 9, the two parts of the split universal-joint shaft 51 being joined with the coupling 53, so that the entire kinematic chain interconnecting the follow-up spool valves 24 and connecting them to their common actuator is closed.

Figure 5:
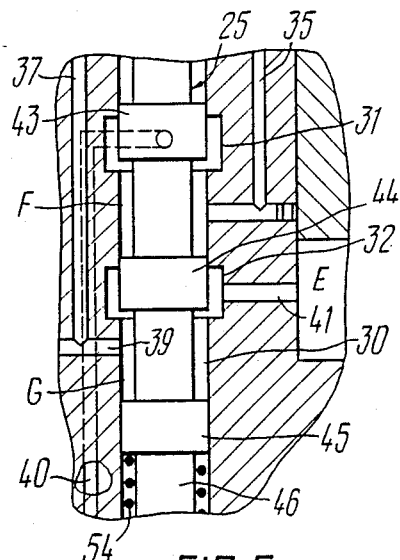
FIG. 5 shows on a still larger scale the area B of FIG. 4, with the spool valve displaced from the neutral position.

Then the pressurized working fluid is fed via the pressure connection 33 (FIG. 4) and pressure passage 35 of each respective hydraulic cylinder 20 of the clamping device into the annular space F defined in the bore 30 of the valve housing 26 by the shoulders 43 and 44 of the valve member 25 occupying at this stage the neutral position where the respective spaces of the counterbores 31 and 32 are closed by the shoulders 43 and 44 of either the same or slightly greater width. The electric motor 47 (FIG. 2) is energized to rotate the lead screws 29 (FIG. 4) of the respective lead screw and nut couples 28 through the worm-gear reducer 48 (FIG. 2), the universal-joint shafts 50 and 51 and the bevel gearings 49 (FIG. 4) of the respective hydraulic cylinders 20. Each lead screw 29, while being thus rotated in the nut 55 fast with the housing 22, moves axially in the splined bore of the output shaft of the respective bevel gearing 49 in the direction from the centre towards the periphery of the clamping device. The valve member 25 urged against the end face of the lead screw 29 by the compression spring 24 follows the motion of the lead screw 29, the motion of the valve member 25 being guided in the bore 30 of the valve housing 26 by the shoulders 42 and 45 engaging the inner wall of the bore 30, towards the position shown in more detail in FIG. 5. In this position open slits appear between the edges of the counterbores 31 and 32 of the bore 30 of the valve housing 26 and the adjacent edges of the respective shoulders 43 and 44. Consequently, the working fluid is supplied from the annular space F of the spool valve member 25 into the counterbore 31, wherefrom it flows via the passage 40 into the above-piston space D of the hydraulic cylinder 20. Simultaneously, the working fluid filling the under-piston space E of the hydraulic cylinder 20 finds its way via the passage 41 and the slit between the shoulder 44 and counterbore 32 into the annular space G of the spool valve member 25, defined between the shoulders 44 and 45, wherefrom it flows via the inlet 39 into the drain passage 37, to flow further from the drain connection 34 into the drain tank (not shown). The pressure of the working fluid in the above-piston space D (FIG. 4) makes the housing 22 of the hydraulic cylinder 20 jointly with the shoes 23 move relative to the piston rod 21 fast with the semi-housing 1, towards the pipe 3 to be clamped. Moving jointly with the housing 22 of the hydraulic cylinder 20 is the strap 56 with the nut 55 pulling the lead screw 29 therealong. The latter, while continuing rotation under the action of the energized motor 47, unscrews itself from the nut 55 in the direction opposite to the displacement of the nut 55. The valve member 25 urged against the end face of the lead screw 29 acts as the follow-up spool valve, remaining in the position shown in FIG. 5 (or slightly oscillating axially from this position) until the pressure in the above-piston space D into which the working fluid is still being supplied rises above a predetermined value corresponding to all the shoes 23 being pressed to the pipe 3 with the required clamping effort. This causes a response of a pressure-actuated electric relay (not shown) in the control system of the clamping device, sending a signal to break the supply circuit of the motor 47 (FIG. 2), and the rotation of the lead screw 29 (FIG. 4) ceases.

While the pipe 3 is thus being clamped by the action of the hydraulic cylinders 20, it is automatically aligned and centered relative to the semihousing 1, which is ensured by the synchronism of the actuation of the follow-up spool valves 24 from the common actuator.

The other pipe 4 is clamped by the clamping device mounted on the semihousing 2 in the same manner as the abovedescribed clamping of the pipe 3. Owing to the semihousings 1 and 2 being interconnected by the bars 19, the pipe 4 to be welded is centered with respect to the pipe 3 fixedly held in the semihousing 1.

With the two pipes 3 and 4 to be welded thus positively clamped and centered, they are resistance butt-welded in the known procedure, with the semihousings 1 and 2 (FIG. 1) being urged towards each other by the power cylinders 16 of the flush and upset drive.

Figure 6:
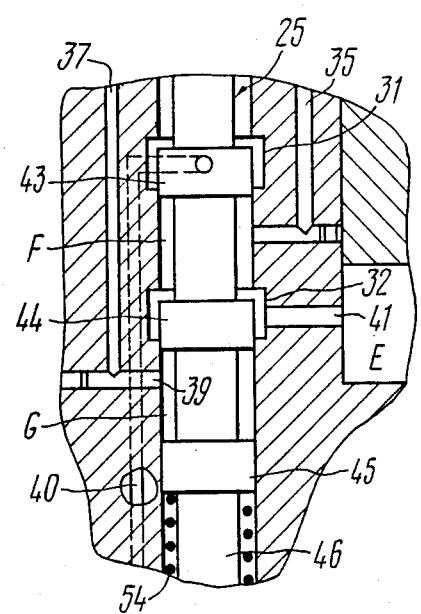
FIG. 6 shows the same as FIG. 5, but with the follow-up spool valve displaced to the opposite side from the neutral position.

The releasing of the clamping devices and the opening of the semihousings 1 and 2 after the completion of the welding operation is performed in the reversed sequence, with the electric motor 47 (FIG. 2) of each clamping device being energized for rotation in the opposite sense, so that the spool valve members 25 are displaced in the opposite direction, as shown in FIG. 6. With the semihousings 1 and 2 (FIG. 1) of the machine opened, the machine for resistance butt welding of pipes is transferred to the successive joint, and the abovedescribed procedure of clamping, centering and welding is repeated.

The disclosed machine for resistance butt welding of pipes is compact, or relatively small weight, and suitable for welding pipes in a broad range of diameters (including diameters up to 550 mm), ensuring not only reliable clamping of the pipes to be welded, but also their accurate centering, which is essential for the high quality of welds.

What is claimed is:

1. In a machine for resistance butt welding of pipes, comprising two semihousings adapted to be mounted externally onto the pipes to be welded to the opposite sides of a joint, a flash and upset drive operatively connected with said semihousings, a clamping device accommodated in each one of said semihousings, including a plurality of radially arranged hydraulic cylinders having each a piston rod rigidly connected with the respective one of said semihousings, and a housing; shoes mounted on the respective housings of said hydraulic cylinders, and a control system of said hydraulic cylinders, including a plurality of control valve means with follow-up spool valves structurally associated with said piston rods of the respective ones of said hydraulic cylinders, and a common actuator for displacing said follow-up spool valves of said respective control valve means.

2. A clamping device as set forth in claim 1, wherein said respective follow-up spool valves of said control means are interconnected and connected to said common actuator of their displacement through a mechanical linkage including universal-joint shafts.

3. A clamping device as set forth in claim 1, wherein said follow-up spool valve of each said control valve means includes a spool valve member accommodated for axial displacement in the piston rod of the respective one of said hydraulic cylinders, and a lead screw and nut couple with the lead screw mounted for axial displacement relative to said piston rod of said respective hydraulic cylinder coaxially with said spool valve member, said spool valve member being resiliently urged against the end face of said lead screw of said lead screw and nut couple, and the nut of said lead screw and nut couple being rigidly connected with the housing of said respective hydraulic cylinder.

* * * * *